Nov. 22, 1927.

L. ROUANET 1,649,978

SPLIT PULLEY

Filed Feb. 10, 1926     2 Sheets-Sheet 1

L. Rouanet
INVENTOR

By: Marks & Clark
Attys

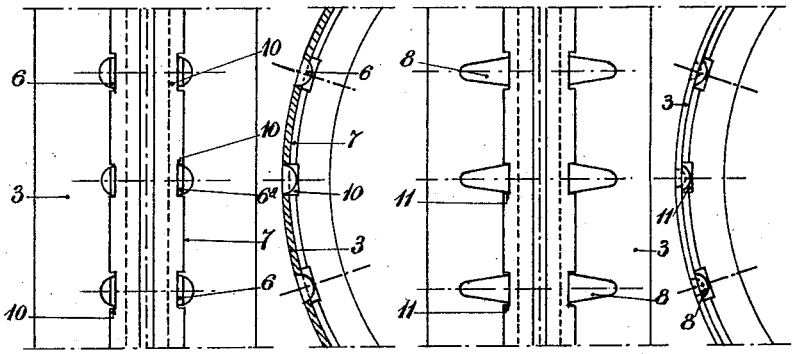

Patented Nov. 22, 1927.

1,649,978

UNITED STATES PATENT OFFICE.

LOUIS ROUANET, OF IVRY-PORT, FRANCE, ASSIGNOR TO COMPAGNIE D'APPLICATIONS MECANIQUES, OF IVRY-PORT, FRANCE, A FRENCH COMPANY.

SPLIT PULLEY.

Application filed February 10, 1926, Serial No. 87,417, and in France March 2, 1925.

The present invention concerns split pulleys comprising: a hub part or member used for securing the pulley onto the shaft; a rim or equivalent part or member; connecting means such as arms, spokes, discs, etc., disposed between said hub and rim parts and an outer band in one or several sections, receiving the belt and assembling the constituent parts of the pulley.

The invention has for its object improvements in the method of securing the outer band to the body of the pulley, which improvements are mainly characterized in that tongues, ears or the like are punched, stamped or otherwise formed on the outer band; in order to secure same in circular and axial directions relative to the pulley body.

Other features will appear more clearly from the following description with reference to the accompanying drawings in which:

Fig. 3 is a partial plan (viewed from the inside) showing the method of securing the band to the pulley body.

Fig. 4 is a sectional view taken on line B—B in Fig. 3.

Figs. 5 and 6 are views similar to Figs. 3 and 4, of an alternative construction.

Fig. 7 is a view similar to Fig. 4, of another alternative construction.

Figs. 8 to 10 illustrate a method of securing the outer band against circular and axial displacements.

Figs. 11 to 13 inclusive illustrate another alternative form of the method of attachment shown in Figs. 8 to 10 inclusive.

Fig. 14 shows a band formed of a single piece.

Figure 1:
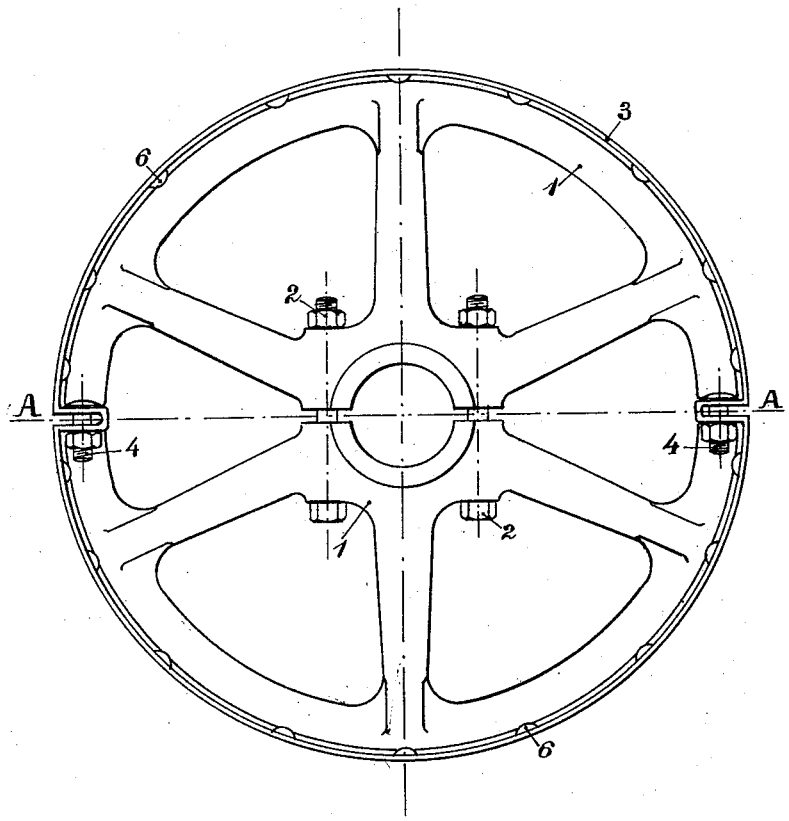
Fig. 1 is a side elevation of a pulley constructed according to the invention.
Figure 2:
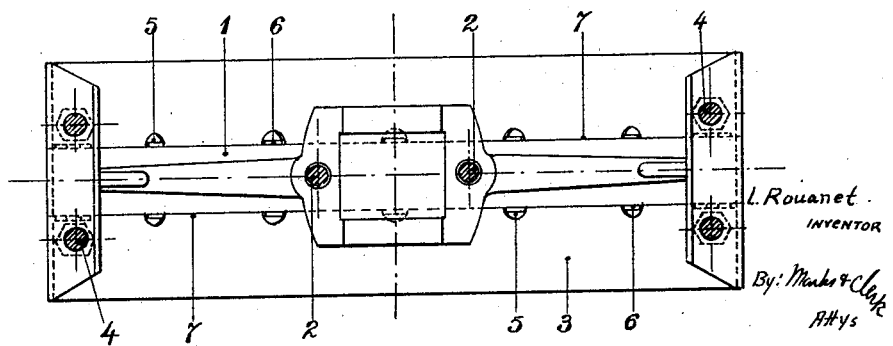
Fig. 2 is a diametrical section taken along the line A—A of Fig. 1.

In the arrangement illustrated in Figs. 1 to 4 inclusive, the body of the pulley is divided into two symmetrical parts 1—1, and said pulley body is secured onto the shaft (not shown) by means of bolts 2 extending through the hub part.

According to the invention, the outer band 3 receiving the belt is secured onto the pulley body 1—1 by tightening the bolts 4 extending through the bended parts of the outer band, the latter serving to hold the constituent parts of the pulley together.

The band 3 is secured against axial displacement relative to the pulley body 1—1 by means of tongues or ears 6, punched in the said band and suitably turned back against the lateral faces 7—7 of the pulley body.

In the arrangement shown in Figs. 5 and 6 the tongues or ears 6 are formed by embossed parts 8 of elongated form and semicircular cross section.

In the arrangement shown in Fig. 7, the outer band is punched out between the embossed portions 8 so as to form openings or apertures 9 allowing for an increasing adherence of the belt.

Aside from preventing the axial slipping of the band the tongues, ears or embossed parts are used to prevent any movement of the band in circular direction and for this purpose the said tongues or equivalent means are located into notches or cuts 10 provided in the lateral faces of the rim 7 of the pulley body as more clearly illustrated in Figs. 8 to 13 of the drawings.

In order to enable the outer band to be tightened onto the pulley body by means of the bolts 4, certain of the notches or cuts 10 or 11 are made slightly larger than the tongues 6 or embossed parts 8, but as seen in Fig. 8, the middle tongues 6ª fit exactly in the corresponding notches or cuts so as to cause the outer band to rotate without slipping.

In Figure 14, the outer band is formed of a single piece split at 12, the part diametrically opposite 12 being rendered elastic by means of an inwardly turned portion 13 formed in the outer band, bolts or the like being provided for the purpose of tightening said band onto the pulley body.

It is to be understood that the said one-piece band can be provided with means preventing its circular and/or axial displacement relative to the pulley body, and that the said retaining means may retain various other forms than those described without exceeding the limits of the invention.

I claim—

1. A split pulley comprising a hub member, a rim member provided with a series of notches in the side faces thereof, connecting means between the hub member and the rim member, an outer band formed of a plurality of sections tightened together for assembling the aforesaid members, and a series of tongues extending from the band member and engaged in the notches in the rim member to prevent both axial and circular movements of said band relative to said rim member.

2. In a split pulley according to claim 1, wherein certain of the notches of the rim member are of the same width as that of the tongues, while the other notches of the said rim member are of greater width relative to that of the corresponding tongues.

3. In a split pulley according to claim 1, wherein the notches opposite the middle tongues of each section of the band are of the same width as that of the said corresponding tongues while the remaining notches corresponding to the other tongues are of gradually increasing width towards the ends of the band sections.

4. A split pulley comprising a hub member, a rim member having a series of notches in the side faces thereof, connecting means between the said hub and rim members, an outer band formed of a single split piece including at least one inwardly bent and resilient portion, means in the form of tongues stamped in the said band and extending into corresponding notches of the rim member, and at least one of said tongues fitting exactly in its corresponding notch.

5. A split pulley including a rim member having a series of notches in the side faces thereof, a two part body and a two part outer band tightened together on the said body, each half of said band being provided with tongues extending into corresponding notches of the rim member to prevent both axial and circular movements of the said band relative to said rim.

LOUIS ROUANET.